UNITED STATES PATENT OFFICE.

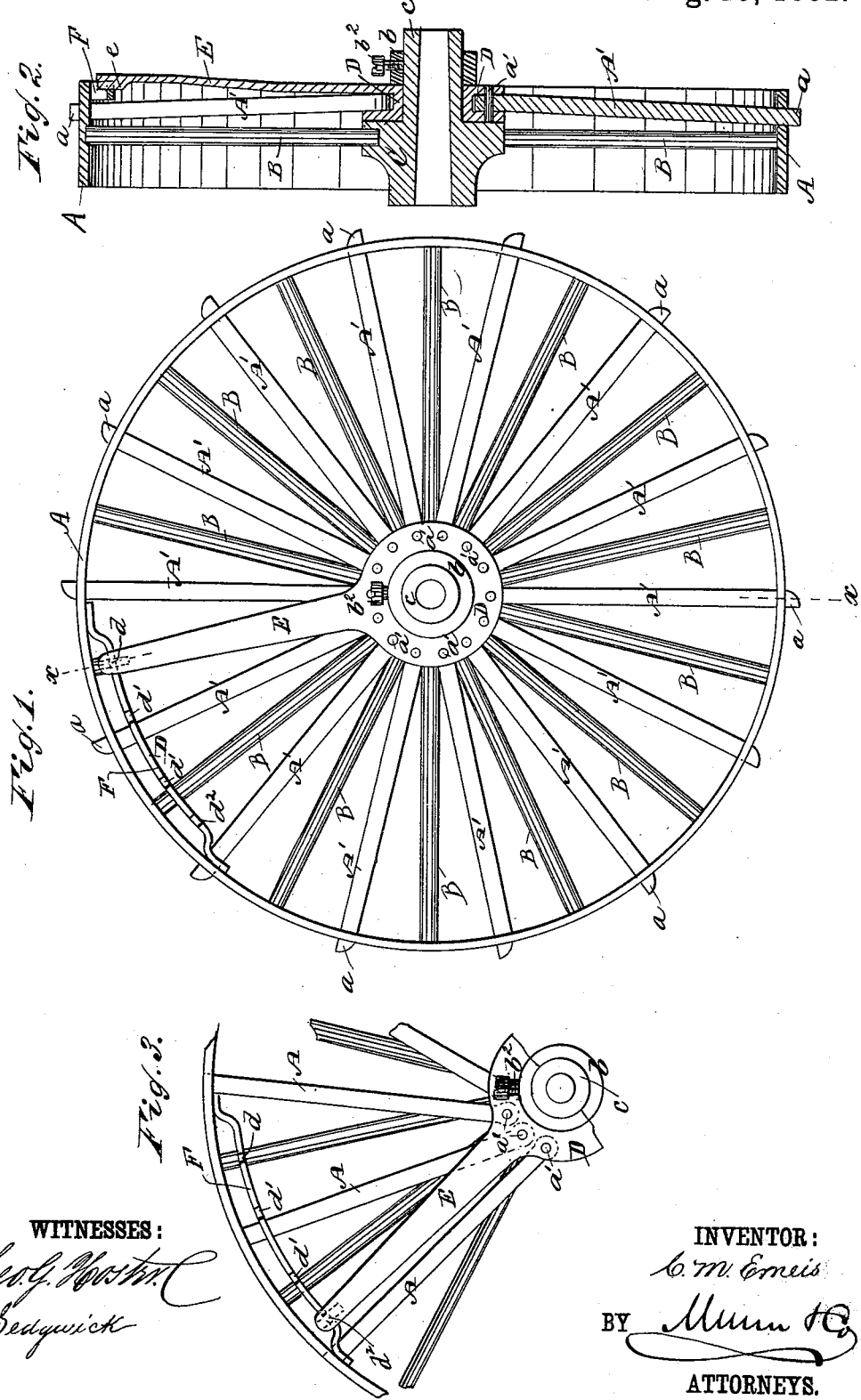

CHARLES M. EMEIS, OF MOUNT JOY, IOWA.

TRACTION-WHEEL.

SPECIFICATION forming part of Letters Patent No. 262,752, dated August 15, 1882.

Application filed May 10, 1882. (Model.)

*To all whom it may concern:*

Be it known that I, CHARLES MATHIAS EMEIS, of Mount Joy, in the county of Scott and State of Iowa, have invented a new and Improved Traction-Wheel, of which the following is a full, clear, and exact description.

The object of my invention is to provide a traction-wheel of improved construction adapted for use to support traction or road engines for hauling loads on common roads and upon various agricultural implements—such as mowing and reaping machines—to prevent slip of the wheels and consequent waste of power in the engines and imperfect action of other machines depending upon the traction of wheels for their proper operation.

The invention consists in the combination, with the rim or tread of a wheel, of teeth, spurs, or spikes fitted adjustably in or at the wheel-rim to be projected to enter the road-bed a greater or less distance for varying tractive effect, and also adapted to be withdrawn entirely from or within the rim of the wheel to avoid damage to the machine carried by the wheels or the road-bed over which they travel.

The invention further consists in means, whereby the traction teeth or spikes may be simultaneously projected beyond or withdrawn from the wheel rim or tread; and also in means whereby the adjustable traction-teeth may be locked fully projected or withdrawn, or in any intermediate position, as will be hereinafter fully described.

Reference is to be had to the accompanying drawings, forming a part of this specification, in which similar letters of reference indicate corresponding parts in all the figures.

Figure 1 is a face or side view of a wheel constructed in accordance with my invention, showing the traction-teeth projected. Fig. 2 is a cross-sectional edge view of the same on line $x\,x$ of Fig. 1, and Fig. 3 is a partial face view with the traction-teeth withdrawn inside the tread of the wheel.

The drawings represent the present preferred plan of carrying out the invention, showing a wheel built up of rim A, connected by fixed spokes B, with a central hub, C, apertured to receive the axle or shaft of the road-engine or farming implement. This wheel A B C may be made of any size and of any approved material, either wholly of metal or wood, or of both suitably combined, as best suited to the requirements of its intended use.

As here shown, the hub C is reduced in size at the outer side of the wheel, forming the projecting bearing $c$, on which is loosely fitted the central sleeve, D, in this instance formed of a single piece having the deep annular edge groove or recess, $d$, in which, at suitable intervals, are pivoted, on bolts $a'$, the inner ends of the bars or shanks A′, which project outwardly to, in, and through the rim A of the wheel, their outer ends, $a$, forming the adjustable spurs or traction-teeth for entering the road-bed to prevent slip of the wheel. The sleeve D is held in place and against endwise movement on the bearing $c$ by the collar $b$, secured by set-screw $b^2$, or by other suitable fastening.

It is evident that the sleeve D may be made of two plates with inside abutting flanges of a height equal to half the thickness of bars A′, or of two flat plates placed on bearing $c$, and either with or without a spacing-piece between them of a thickness equal to that of bars A′, and the teeth $a$ may be guided at the edge of the rim A of the wheel in clips or keepers secured to the rim; but their arrangement to pass through the rim to be guided therein, as shown, is preferred for cheapness of construction and greater strength to resist strains.

The sleeve D has formed upon or attached to it a lever, E, adapted, by its detent $e$, to engage with one of a series of teeth or notches, $d\ d'\ d^2$, in the edge of a catch or lock plate, F, fixed to the wheel-rim A, as shown. The lever E may have sufficient elasticity to remain firmly locked in any one of the notches of the catch-plate F, or may be provided with any suitable means to insure its engagement therewith until intentionally shifted to work the traction-teeth $a$, as next described. When the lever E, arranged relatively to the other parts, as shown, is locked in notch $d$ of the catch-plate F, the bars A′ will stand in about a radial position in the wheel, with the traction-teeth $a$ projected from the wheel tread or rim, as in Figs. 1 and 2, in their extreme forward position, and when lever E is locked in notch $d^2$, as in Fig. 3, the teeth $a$ will be entirely withdrawn within the rim A. On shifting lever E the sleeve D is partially rotated on its bearing, causing the inner pivoted ends of bars A' to be carried with the sleeve and to assume a position tangential to a larger or smaller circle at the center of the wheel. By locking lever E in any one of the intermediate notches $d'$ the degree of projection of the teeth $a$ may be controlled at will to suit the character of the roadway. For instance, for purposes of transportation merely, the engine or machine mounted on these improved wheels may be moved from place to place and over wooden bridges, wharfs, and railway-platforms with the teeth $a$ withdrawn, as in Fig. 3, to avoid needless jarring of the engine or machine or damage to any such wooden structure; or when the engine is at work hauling loads over dry roads the teeth $a$ may remain withdrawn, the weight of the engine affording sufficient traction to move the load. Should the road be slippery or icy, the teeth $a$ may be slightly projected, and on soft and muddy roads they may be farther projected for sufficient tractive effect, the arrangement of the teeth $a$ for simultaneous movement permitting their immediate adjustment, as desired, to suit varying conditions of the road—to be projected at soft places and withdrawn when traveling over a rocky surface, and with little or no loss of time.

Traction-wheels having the ordinary corrugated or spiked treads may also be fitted with these adjustable traction-teeth to enable them to haul heavier loads in road-engines, or to insure more reliable working of the operative parts of agricultural machines.

My improved traction-wheel is also less liable to be clogged by earth or clay than ordinary traction-wheels, and adhering substances may at any time be removed from the teeth $a$ by their withdrawal through the wheel-rim, which acts as a scraper to clear the track, and their desired tractive effect may thus be always preserved.

The teeth $a$ may have any suitable cross-section or shape of point, and their number in a wheel may vary with its size and use.

As will appear from Fig. 2, the greater portion of the wheel rim or tread is unobstructed by the adjustable teeth $a$, permitting the application of any approved form of brake to either the inner or outer surface of the rim of the wheel.

It is evident that the adjustable teeth $a$ may be fitted singly in the rim of the wheel and locked at any desired projection by suitable means; but the advantages of the construction shown and above described in affording simultaneous adjustment of the traction-teeth and in supporting them to resist compressive strains from the center of the wheel combine to make this improved wheel cheap of construction and effective and durable in use.

Having thus described my invention, I claim as new and desire to secure by Letters Patent—

In traction-wheels, the lock-plate F, combined with lever E and adjustable traction-teeth $a$, substantially as shown and described.

CHARLES MATHIAS EMEIS.

Witnesses:
CHAS. F. KENT,
H. A. EMEIS.